April 10, 1951 H. D. HOUGHTON ET AL 2,548,216
VENTILATED BAND CLAMP

Filed July 1, 1946 2 Sheets-Sheet 1

INVENTOR.
HOWARD D. HOUGHTON
BY THEODORE A. WOOLSEY

Lymer Latta
ATTORNEY

April 10, 1951  H. D. HOUGHTON ET AL  2,548,216
VENTILATED BAND CLAMP
Filed July 1, 1946  2 Sheets-Sheet 2
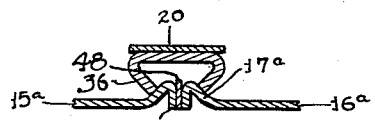
Fig.5
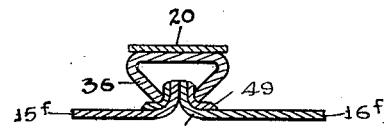
Fig.10
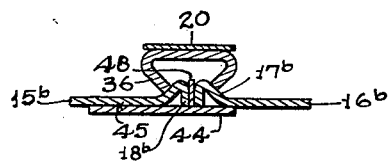
Fig.6
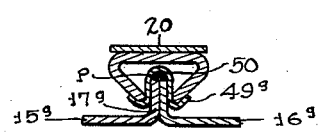
Fig.11
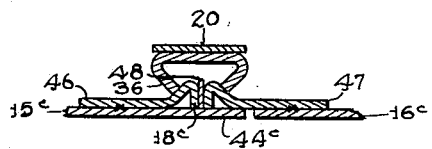
Fig.7
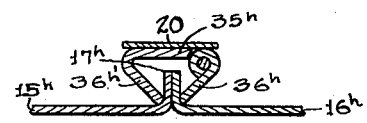
Fig.12
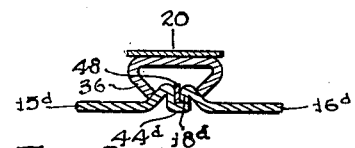
Fig.8
Fig.13
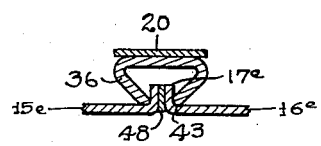
Fig.9
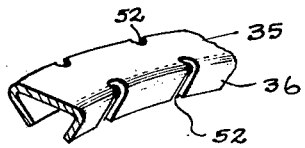
Fig.14
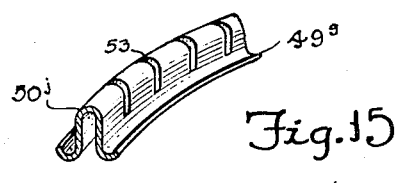
Fig.15
*INVENTORS*
HOWARD D. HOUGHTON
BY THEODORE A. WOOLSEY
*ATTORNEY*

Patented Apr. 10, 1951

2,548,216

UNITED STATES PATENT OFFICE 2,548,216

VENTILATED BAND CLAMP

Howard D. Houghton, Los Angeles, and Theodore A. Woolsey, Pasadena, Calif., assignors to Marman Products Co., Inc., a corporation of California Application July 1, 1946, Serial No. 680,802

12 Claims. (Cl. 285—129)

This invention relates to a device for establishing a sealing connection between the ends of aligned tubular members. Its general object is to provide an improved band clamp type of connecting and sealing means. While the invention may be utilized for connecting various types of tubular members, it is particularly useful in connecting internal combustion engine exhaust pipes. For this purpose, the invention aims to provide a band clamp that is ventilated so as to minimize concentration of heat in the pipe joint.

A specific object of the invention is to provide a band clamp adapted to act against abutted flanges of adjacent tubular members in a manner to transform constricting radial forces into axial forces under which the flange members are forcibly pressed into sealing engagement with each other or with an interposed gasket ring. The invention contemplates the possibility of utilizing camming action against frusto conical faces of such flanges in order to initially bring the flanges together, taking up the clearance therebetween, but aims, in the final clamping action, to eliminate the necessity for relying upon camming action in the transformation of radial forces into axial components.

This characteristic of the invention becomes important in making it possible to eliminate machining of the interacting surfaces to close tolerances, and to utilize relatively inexpensive stamped and formed sheet metal parts in the clamping mechanism. Therefore, an important object of our invention is to provide a band clamp that is relatively simple and quite inexpensive in construction, yet at the same time very efficient in the execution of its intended functions. One of these functions is of course to exert opposed axial forces against the flanged ends of tubular members to establish sealing connection therebetween. Another function is to form a mechanical connection between the abutted ends of tubular members which connection will securely hold the tubular members in alignment with each other.

Another object of the invention is to provide a band clamp which, in transforming constricting radial forces into opposed axial forces, will increase the ratio between the axial and the radial forces during progressive constriction of the clamp. That is to say, the clamp will develop an increasing leverage against the abutted flange members as the constriction of the clamp progresses.

Other objects will become apparent in the ensuing specifications and appended drawings in which:

Fig. 5 is a detail sectional view of a modified form of the invention;

Fig. 6 is a detail sectional view of another modification of the invention;

Fig. 7 is a detail sectional view of another modification of the invention;

Fig. 8 is a detail sectional view of another modification of the invention;

Fig. 9 is a detail sectional view of another modification of the invention;

Fig. 10 is a detail sectional view of another modification of the invention;

Fig. 11 is a detail sectional view of another modification of the invention;

Fig. 12 is a detail sectional view of another modification of the invention;

Fig. 13 is a side view of another modification of the invention;

Fig. 14 is a perspective view of a portion of the band structure of Fig. 2;

Fig. 15 is a perspective view of another modification of the invention.

Figure 1:
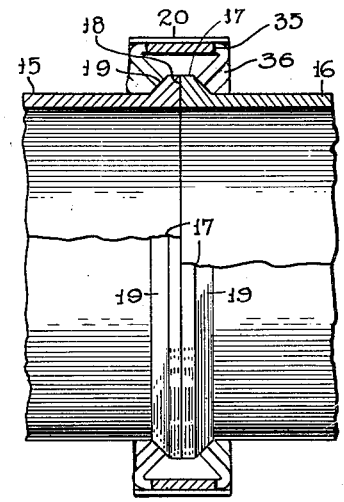
Fig. 1 is a side view, partially in section, of a tube joint embodying our invention.

Figs. 1 to 4 inclusive illustrate the invention in one of its simplest forms. End portions of a pair of tubular members to be joined are indicated at 15 and 16 respectively. Each of these two members is provided with an outwardly extending flange 17 which has a squared end surface 18 and a frusto-conical outer surface 19 constituting a shoulder against which my improved band clamp may react.

The band clamp comprises an outer constricting band 20 of a material having a high tensile strength, such as, for example, ribbon steel. The ends of the band are bent to form ears 22, and are braced by gussets 23. A draw bolt 24 is extended through openings in the ears 22. The bolt 24 is also extended through a pair of collars 25 and 28, the ends of which are engaged against the ears 22. The head of the bolt engages the collar 25 and a nut 32 coacts with threads 33 on the other end of the bolt, to exert pressure against the sleeve 28, thus constricting the band.

The constriction of the band 20 is utilized to exert radial pressure against a pair of jaw members 34, each substantially semi-circular in general shape. Each jaw member 34 includes an arcuate web portion 35 and a plurality of fingers 36 that are arranged in axially opposed pairs, with the two fingers of each pair converging towards the main axis of the clamp. The fingers 36 are so dimensioned and so disposed as to engage the conical surfaces 19 of the flanges 17 when the flanges 17 are in initial, loose abutting relation to each other, and to maintain such engagement after the flanges 17 have been pressed tightly together.

Figure 4:
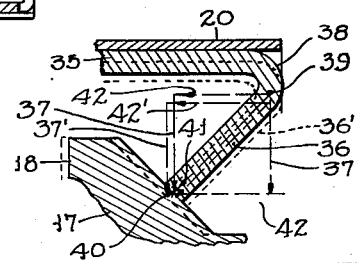
Fig. 4 is an enlarged detail and diagrammatic view of a portion of the clamp mechanism, illustrating the action thereof.
Figures 2, 3:
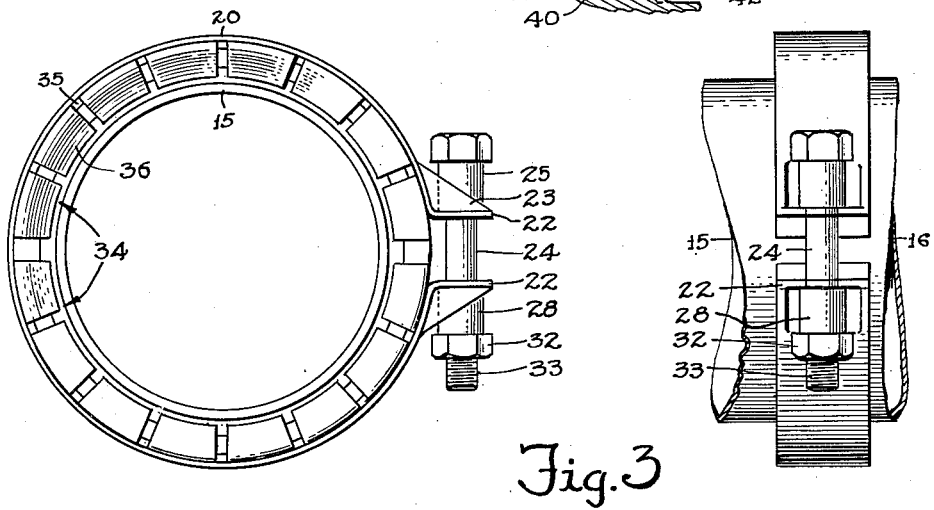
Fig. 2 is a face view of our improved band clamp.
Fig. 3 is a side view of our improved band clamp.

Fig. 4 illustrates, by means of a diagram of forces, how the constricting radial pressure, applied to the fingers 36, is resolved into axial forces pressing the flanges 17 into sealing engagement with each other. In the diagram, a constricting radial force is indicated by the vector line 37. This is the force that is applied by the band 20 to the web members 35. This same force is of course applied to the conical flange surface 19. From the web 35, this force is transferred to the fingers 36 through the bends 38 in the fingers. For the purpose of developing the force diagram, we have arbitrarily selected the point 39 in the bend 38 as indicating the point of transfer of the constricting radial force to a finger 36. From the point 39 where the finger 36 receives the force to the point 40 at the tip of the finger 26 where it is transferred to the inclined flange surface 19, the radial force 37 is resolved into a resultant, indicated by the arrow 41, acting through the length of the finger 36 and therefore having the same inclination as the finger 26. Stated more simply, the fingers 36, under the constricting radial force 37, press inwardly and axially against the surfaces 19 in inclined directions roughly normal to said surfaces 19. These inclined resultant forces 41 have as their components the restricting radial forces 37 and the axial forces indicated by the arrow 42. In each pair of arms, the forces 42 are aligned and directed toward each other so as to press the faces 18 of flanges 17 into sealing engagement.

In the initial stages of tightening the clamp, there may be some sliding movement between the tips of the fingers 36 and the surfaces 19, giving a camming action which is effective to move the flanges 17 toward each other, taking up any clearance that may exist between them. As the flanges 17 come together and resist further movement, thus building up pressure between the fingers 36 and the surfaces 19, it is no longer necessary for any movement to occur between the contacting tips of the fingers 36 and the surfaces 19. Beyond the point where the tips of the fingers 36 make binding engagement with the surfaces 19, it is still possible for additional constriction to be imposed by the band 20, being accommodated by flexing of the fingers 36 at the bends 38. Exaggerated for the sake of illustration, the flexed position of a finger 36 is indicated in dotted lines at 36' in Fig. 4. As the result of such flexing, the fingers 36 will act somewhat in the nature of toggle struts. To illustrate, considering that the fingers 36 are, roughly, pivoting around the points 39 under constricting pressure from the band 20 which moves the points 39 radially inwardly, as the pivot points move radially inwardly the tips of the fingers 36 will be forced to move axially. Also, because of the toggle-like action, the progressive flexing of the fingers 36 will be accomplished by a progressive increase in the ratio between the axial and radial components of the resultant force 41. That is, for a given amount of constricting radial pressure there will be an increasing axial force applied to the flanges 17 as the constriction progresses. This is indicated in the diagram by the greater length of the axial vector line 42' as compared to the line 42 and the decreased length of the radial vector line 37' as compared to the line 37.

It is understood that the flexing of the fingers 36, indicated in Fig. 4, is greatly exaggerated and that the actual amount of flexing that may occur will be slight, particularly when the flanges 17 are brought together without the interposition of a gasket therebetween. The important characteristic of the invention in this respect is that it is possible for the fingers 36 to continue to transmit force from the band 20 to the flanges 17 without the necessity for sliding movement occurring between the fingers and the surfaces 19. This characteristic becomes particularly important in making it possible to utilize relatively inexpensive parts of formed sheet metal requiring no machining of interacting surfaces. Any slight irregularities or inaccuracies that may exist in these surfaces will be compensated for by slight yielding of those fingers 36 that engage the surfaces 19 ahead of other fingers 36. It is then possible for all of the fingers 36 to adjust themselves to the surfaces 19 and substantially equalize their pressure against the flanges 17 after a preliminary state of constriction has occurred.

By eliminating the necessity for machining the flanges 17, it becomes possible to utilize flanges that have been simply upset, (e. g. the flanges shown in Fig. 1) or flanges, such as the flanges 17a of Fig. 5, that have been rolled into the ends of the tube members 15a and 16a.

That characteristic of the invention which makes it possible to eliminate the necessity for sliding contact between the fingers 36 and the two flanges during the final stages of constriction, also makes it possible for the fingers 36 to seat themselves in the corners 43 at the bases of the flanges 17e, as indicated in Fig. 9. With the fingers thus engaged, it is obviously impossible for their inner ends to move farther inwardly. Consequently, any movement of the inner ends of the fingers 36 that occurs after they have become snugly seated in the corners 43, will be purely an axial movement, and constriction of the bands 20 is accommodated by the flexing of the fingers 36 as described above.

Utilizing this characteristic of the invention to its fullest, it becomes possible to eliminate entirely the conical flange surfaces 19. Thus the flanges may be reduced to the extremely simple form of plain, outwardly extending radial flanges 17e shown in Fig. 9.

Engagement of the fingers 36 at the bases of the flanges 17e provides maximum efficiency in the execution by the band clamp of an additional function, namely, that of holding the tubular members 15e, 16e, in accurate alignment, preventing lateral displacement of one tube member relative to the other. The same function is executed with somewhat less efficiency, in the arrangement shown in Fig. 1.

In many cases, however, it may be desirable to provide for telescoping between the tube members, and in Fig. 6 we have shown for this purpose, a pilot sleeve 44 welded at 45 into one of the tube members (e. g. the tube member 15b) and adapted to be piloted within the other tube member 16b.

The flanges 17 need not necessarily be integral with the tube members that are to be connected. For example, the tube members 15c, 16c, shown in Fig. 7, may be welded into separate sleeve members 46 and 47 on which the flanges 17c are formed. With such an arrangement, one of the tubes (e. g. the tube 15c) may be extended beyond its respective flange 17c to form a pilot 44c receivable in the sleeve member 47, the tube 16c being terminated short of its respective flange 17c to provide a space to receive the pilot 44c. The arrangement shown in Fig. 7 could be modified by forming the sleeve 47 as an integral continuation of the tube 16c, either having the diameter of the tube 16c slightly larger than that of the tube 15c or simply enlarging the tube 16c slightly at its end to form the sleeve 47.

Another piloting arrangement is shown in Fig. 8. In this arrangement, a pilot 44d is formed as an extension of the internal end wall 18d of one of the flanges 17d, and is adapted to be received within the inturned end wall of the other flange 17d.

At this point, it may be noted that in the rolled type of flange shown in Figs. 5 to 8 inclusive, end walls 18a, 18b, 18c, 18d are formed as reentrant extensions of the outwardly rolled frustoconical wall portions 19a, 19b, 19c, 19d of the flanges 17a, 17b, 17c, 17d. These end walls 18a, 18b, 18c, 18d have the same function as the end surfaces 18 of Fig. 1, namely, to provide for sealing between the flanges.

Sealing may be accomplished either by bringing the end walls of the flanges into direct contact with each other or by interposing gasket washers 48, shown in Figs. 5 to 9 inclusive.

Where tubes of relatively soft metal are to be joined, bearing rings 49 of harder metal may be interposed between the tips of the fingers 36 and the corners 43, as shown in Fig. 10. Alternatively, bearing rings 49 of softer metal than the flanges 17f, may be employed to facilitate the adjusting of the fingers 36 to the flanges 17f.

Another modification of the invention is shown in Fig. 11, in which bearing rings 49g are joined together in an annular channel 50 which embraces the flanges 17g and forms a sealing jacket therefor. In this case, sealing may take place between the peripheral edges of the flanges 17g and the internal surface of the channel 50, with a ring of packing material p interposed. Sealing may be facilitated by making the channel 50 of a softer metal than the tubes 15g and 16g, and it becomes immaterial whether the contacting surfaces of the flanges 17g are machined or otherwise provided with sufficient smoothness between said surfaces.

Instead of flexing of the fingers 36, provision may be made for actual hinging connection between a clamping jaw web member 35h, shown in Fig. 12, and the fingers 36h on one or both sides thereof. Such hinging connection is shown at 51. The fingers 36h' on the other side of such jaw may then be rigidly associated with the web members 35h and instead of a flexing action, the constriction of the band 20 will cause the fingers 36h to tilt about their hinge axes 51.

The spaces between the fingers 36 provide for ventilation of the band clamp in order to avoid the trapping of heat between the clamp and the flanges 17. That is, air currents may flow between the clamp and the flanges, to cool the flanges.

It is possible to eliminate the bands 20, and to utilize, as the constricting band, a single continuous web member 35i having formed integrally therewith the fingers 36i and the end ears 22i, as shown in Fig. 13.

It is to be understood that the foregoing description is merely by way of illustration of a number of forms in which the invention may be embodied. Other forms of construction utilizing the principles of the invention may be utilized, and it is not our intention to restrict the appended claims to the specific embodiments herein disclosed.

As shown in Fig. 14, the fingers 36 are separated by slots 52 that extend into the web 35. The same is true of the structure shown in Fig. 13.

Fig. 15 shows a modification of the form of the invention shown in Fig. 11, in which the channel 50j is provided with notches 53 in its periphery, to facilitate flexing of the channel.

We claim as our invention:

1. In a band clamp for connecting together adjacent ends of tubular members including radial flanges having remote, outwardly converging frusto-conical walls, a constricting band, means for applying constricting tension to said band, and force resolving means attached to the respective sides of said band and converging diagonally inwardly therefrom into contact with said frusto-conical walls, said force resolving means functioning, under constricting action of said band, to first exert a sliding, camming action against said frusto-conical walls to move said flanges toward each other to take up clearance therebetween and, when said clearance has been taken up, to operate as toggle means to resolve constricting pressure of said band into axial forces pressing said flanges toward each other.

2. A band clamp as defined in claim 1, wherein said force resolving means extends on the diagonal throughout the radial extent thereof.

3. A band clamp as defined in claim 1, wherein said force resolving means comprises a plurality of fingers each extending diagonally inwardly and toward a respective flange, throughout its length, said fingers being sufficiently flexible to accommodate a small amount of toggle action yet sufficiently stiff to transmit high compressive forces.

4. A band clamp as defined in claim 1, wherein said force resolving means comprises a plurality of fingers each extending diagonally inwardly and toward a respective flange, throughout its length, said fingers being sufficiently flexible to accommodate a small amount of toggle action yet sufficiently stiff to transmit high compressive forces, said fingers being inclined at an angle of approximately 90 degrees to said frusto-conical walls, and terminating in squared ends the inclination of which substantially conforms to that of said frusto-conical wall.

5. A tube connecting mechanism as defined in claim 1 wherein said flanges include frusto-conical remote wall portions and re-entrant flat end wall portions extending inwardly from the outer extremities of said remote wall portions and adapted to cooperate to form a seal between the ends of said tubes, said frusto-conical wall portions and flat end wall portions constituting substantially uniform thickness continuations of the walls of the respective tube section.

6. A tube connecting mechanism as defined in claim 1, wherein one of said tubular members is provided with a pilot adapted to telescope within the other of said tubular members.

7. A tube connecting mechanism as defined in claim 1, wherein said flanges are formed as integral continuations of the end portions of the tube sections and include outwardly converging frusto-conical flange members and flat end flange members extending inwardly from the outer extremities of said frusto-conical flange members and terminating substantially at the inner radius of the body of the tube sections, one of said tube sections having a cylindrical collar secured therein and projecting beyond its respective end flange to form a pilot that is adapted to telescope within the end flange of the other tube section.

8. Tube connecting means as defined in claim 1, wherein said flanges are formed as integral, substantially uniform thickness continuations of the end portions of the respective tube sections, and include outwardly converging frusto-conical flange portions and flat end flange portions extending inwardly from the outer extremities of said frusto-conical flange portions, one of said flat end flange portions having a cylindrical continuation extending therebeyond in the direction away from the respective tube section and constituting a pilot, the other of said flat end flanges having an inner diameter just slightly larger than the outer diameter of said pilot, whereby said pilot may be telescoped within said other end flange portion.

9. In a band clamp for connecting together adjacent ends of tube sections having radial flanges: a constricting band, means for applying constricting tension to said band, and force resolving means comprising frusto-conical jaw means formed integrally with one side of said band and frusto-conical jaw means pivotally connected to the other side of said band, said jaw means converging diagonally inwardly and engaging the respective flanges so as to operate, under constricting action of said band, with a toggle action resolving said constricting pressure into axial forces pressing said flanges toward each other.

10. A band clamp as defined in claim 9, wherein at least one of said jaw means comprises a series of circumferentially separated fingers.

11. A tube coupling mechanism including, in combination with adjacent end portions of tube sections, collars separate from, receiving said end portions and secured thereto, radial flanges formed as integral continuations of the ends of said collars, said radial flanges including outwardly converging frusto-conical flange members and flat end flange members extending inwardly from the outer extremities of said frusto-conical flange members and having an inner diameter just slightly larger than the outer diameter of the tube sections, one of the tube sections being received in and secured to one of said collars and projecting beyond the respective end flange member thereof to form a pilot that is adapted to be telescoped within the end flange member of the other collar, and the other tube section being telescoped within and secured to said other collar and terminating short of its respective end flange member so as to provide a space to receive said pilot; and a band clamp including a constricting band, means for applying constricting tension to said band, a plurality of force resolving fingers converging inwardly from the respective sides of said band, engaging the remote outer walls of said frusto-conical flanges and adapted as the result of pressure action against said walls to resolve constricting pressure of said band into axially directed forces pressing said flanges toward each other.

12. A tube coupling mechanism including, in combination with adjacent end portions of tube sections, radial flanges on the ends of said tube sections, said radial flanges including outwardly converging frusto-conical flange members and flat end flange members extending inwardly from the outer extremities of said frusto-conical flange members, one of said tube sections including a tubular pilot portion having an external diameter slightly less than the internal diameter of said flat end flange members, projecting from the inner wall of said one tube section through the end flange member thereof and adapted to be telescoped through the end flange member of the other tube section and into the adjacent end portion of the latter; and a band clamp including a constricting band, means for applying constricting tension to said band, a plurality of force resolving fingers converging inwardly from the respective sides of said band, engaging the remote outer walls of said frusto-conical flanges and adapted as the result of pressure action against said walls to resolve constricting pressure of said band into axially directed forces pressing said flanges toward each other.

HOWARD D. HOUGHTON.
THEODORE A. WOOLSEY.

REFERENCES CITED

The following references are of record in the file of this patent:

UNITED STATES PATENTS

| Number | Name | Date |
| --- | --- | --- |
| 2,424,436 | Crater | July 22, 1947 |